(12) United States Patent
Shimizu

(10) Patent No.: US 11,762,165 B2
(45) Date of Patent: Sep. 19, 2023

(54) LENS APPARATUS, IMAGE PICKUP APPARATUS, CONTROL METHOD, AND COMPUTER-READABLE STORAGE MEDIUM

(71) Applicant: CANON KABUSHIKI KAISHA, Tokyo (JP)

(72) Inventor: Masato Shimizu, Tochigi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 143 days.

(21) Appl. No.: 17/125,829

(22) Filed: Dec. 17, 2020

(65) Prior Publication Data
US 2021/0199911 A1    Jul. 1, 2021

(30) Foreign Application Priority Data
Dec. 26, 2019   (JP) ................... 2019-236836

(51) Int. Cl.
*G02B 7/00*       (2021.01)
*G03B 5/02*       (2021.01)
*G02B 7/04*       (2021.01)

(52) U.S. Cl.
CPC .............. *G02B 7/005* (2013.01); *G02B 7/04* (2013.01); *G03B 5/02* (2013.01); *G03B 2205/0069* (2013.01)

(58) Field of Classification Search
CPC ................................ G02B 13/18; G02B 13/06
See application file for complete search history.

(56) References Cited

U.S. PATENT DOCUMENTS
2018/0184064 A1*   6/2018   Cheng ................. H04N 13/204

FOREIGN PATENT DOCUMENTS
JP       H5-127061 A    5/1993
JP       H6-175000 A    6/1994

* cited by examiner

*Primary Examiner* — Joseph P Martinez
(74) *Attorney, Agent, or Firm* — CANON U.S.A., INC. IP Division

(57) ABSTRACT

A lens apparatus includes an optical member, a driving device configured to drive the optical member, a detector configured to detect a state relating to the driving, and a processor configured to generate a control signal for the driving device based on first information about the detected state. The processor includes a machine learning model configured to generate an output relating to the control signal based on the first information and second information about the lens apparatus, the second information being different from the first information.

21 Claims, 13 Drawing Sheets

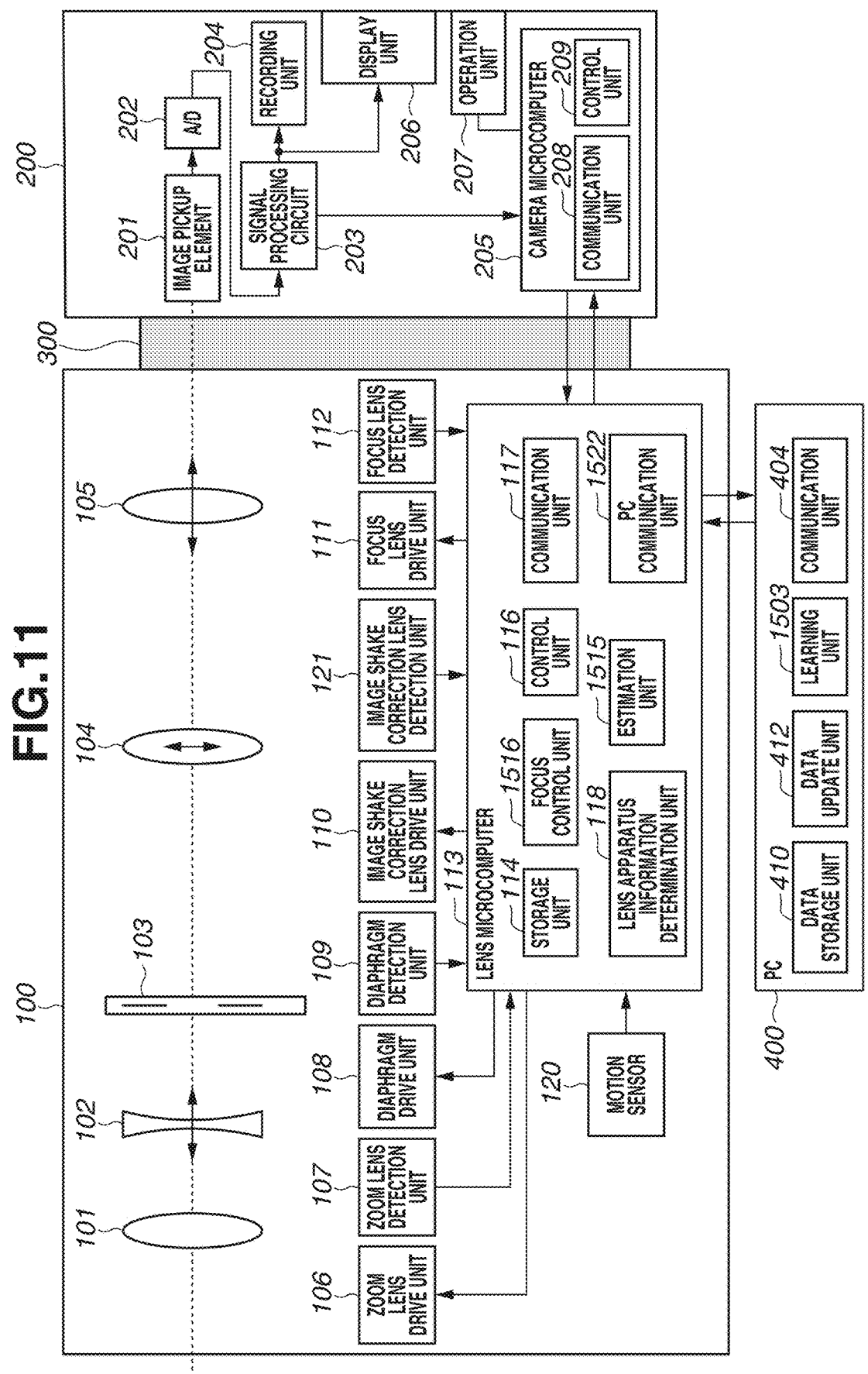

LENS APPARATUS, IMAGE PICKUP APPARATUS, CONTROL METHOD, AND COMPUTER-READABLE STORAGE MEDIUM

BACKGROUND OF THE DISCLOSURE

Field of the Disclosure

The aspect of the embodiments relates to a lens apparatus, an image pickup apparatus, a control method, and a computer-readable storage medium.

Description of the Related Art

Japanese Patent Laid-Open No. 05-127061 discusses a zoom lens that performs control using a combination of a plurality of actuators in accordance with conditional branching based on limit values set for each actuator. To switch a control method to another control method under a specific condition, an arithmetic expression (calculation method) for generating a command signal is changed in general. In a lens operating device discussed in Japanese Patent Laid-Open No. 06-175000, a calculation method is changed (calculation is added) to switch a control method to another control method under a specific condition, for example, when a zoom lens unit is located at a telephoto end or a wide-angle end, or when a focus lens unit is located at an infinity end or a closest-distance end.

In a case where control is performed under a plurality of factors affecting the control, it is difficult to perform control based on the synergy of the plurality of factors. In the control discussed in Japanese Patent Laid-Open Nos. 05-127061 and 06-175000, a change in control operations is discontinuous due to branching of operations (control operations) based on whether a condition is satisfied, so that a change in an obtained image is also discontinuous, which may provide a feeling of strangeness to a viewer who views the image.

SUMMARY OF THE DISCLOSURE

An aspect of embodiments provides a lens apparatus including an optical member, a driving device configured to drive the optical member, a detector configured to detect a state relating to the driving, and a processor configured to generate a control signal for the driving device based on first information about the detected state. The processor includes a machine learning model configured to generate an output relating to the control signal based on the first information and second information about the lens apparatus, the second information being different from the first information.

Further features of the disclosure will become apparent from the following description of exemplary embodiments with reference to the attached drawings.

BRIEF DESCRIPTION OF THE DRAWINGS

FIG. 11 is a block diagram illustrating a configuration example of a system for learning according to a fourth exemplary embodiment.

DESCRIPTION OF THE EMBODIMENTS

Exemplary embodiments of the disclosure will be described below with reference to the accompanying drawings. Basically (unless otherwise noted), the same components and the like are denoted by the same numerals in all of the drawings illustrating the exemplary embodiments and a repeated description thereof is omitted.

First Exemplary Embodiment

Figure 1:
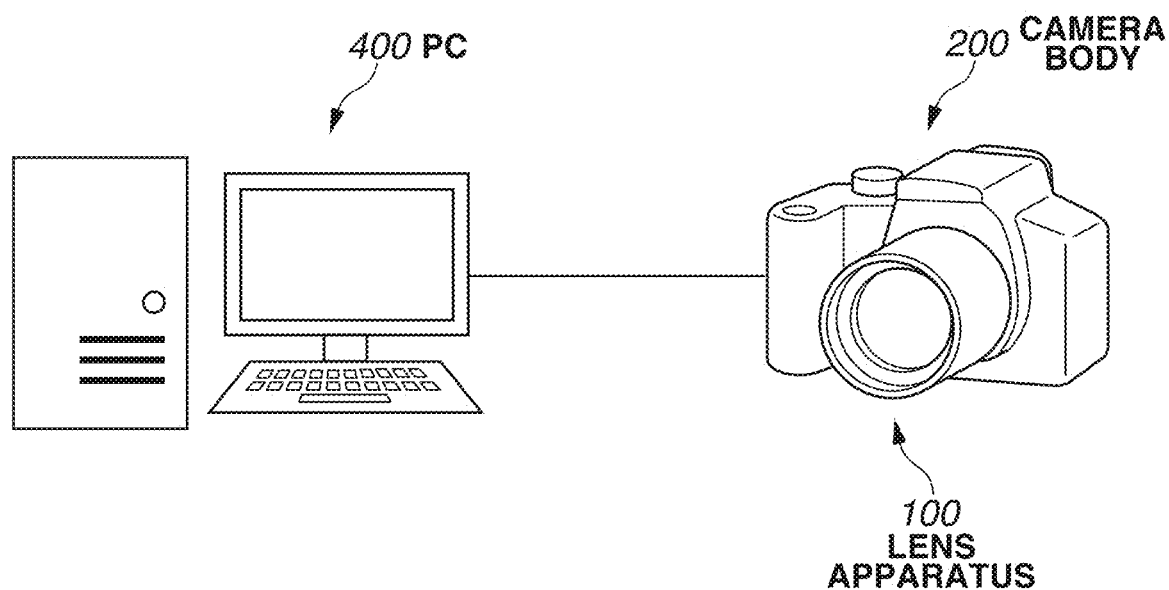
FIG. 1 illustrates a configuration example of a system according to each exemplary embodiment.
Figure 3:
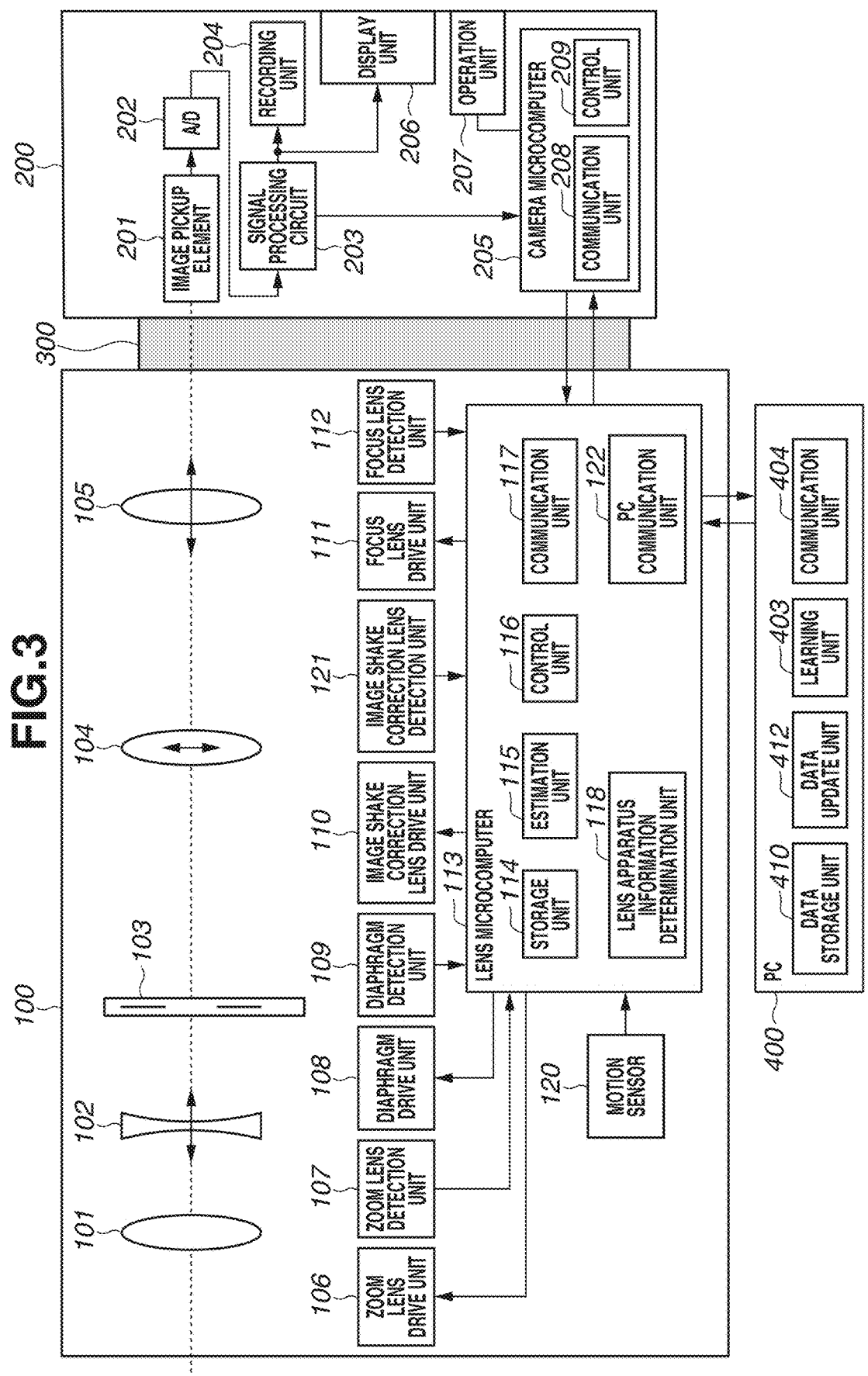
FIG. 3 is a block diagram illustrating a configuration example of a system for learning.

FIG. 1 illustrates a configuration example of a system according to exemplary embodiments including a first exemplary embodiment. FIG. 3 is a block diagram illustrating a configuration example of a system for learning. FIG. 3 also illustrates hardware resources and software configurations of devices included in the configuration example of the system illustrated in FIG. 1.

<Configuration Example of Lens Apparatus>

Figure 2:
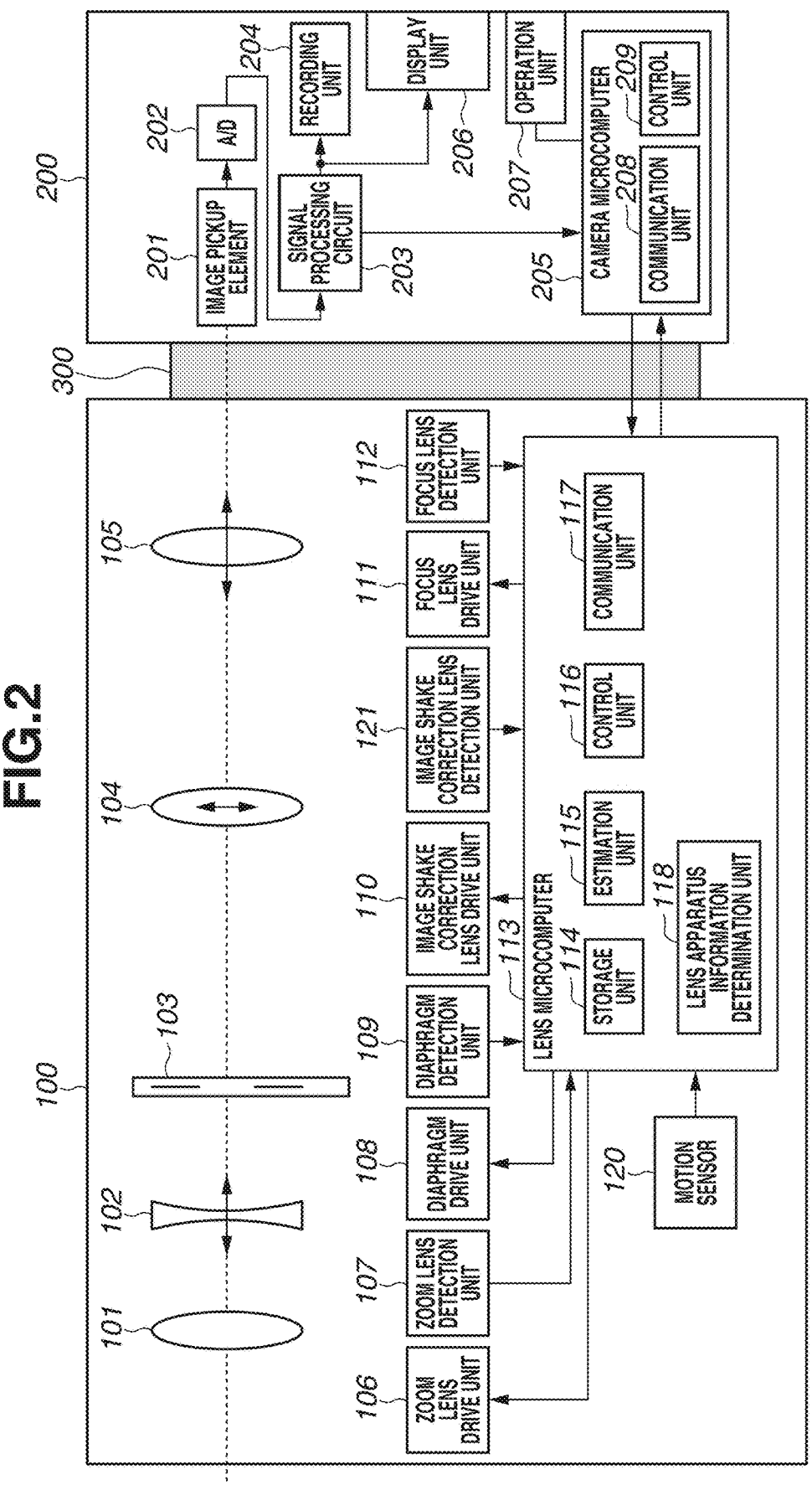
FIG. 2 is a block diagram illustrating a configuration example of a lens apparatus according to a first exemplary embodiment.

FIG. 2 is a block diagram illustrating a configuration example of a lens apparatus according to the first exemplary embodiment. FIG. 2 also illustrates a configuration example of a system (image pickup apparatus) including a configuration example of a camera body. The system includes a camera body 200 and a lens apparatus 100 (also referred to as an interchangeable lens). The camera body 200 and the lens apparatus 100 are mechanically and electrically connected via a mount 300 serving as a coupling mechanism. The mount 300 may include a mount unit belonging to the camera body 200 or a mount unit belonging to the lens apparatus 100, or may include both of these mount units. The camera body 200 can supply power to the lens apparatus 100 through a power supply terminal included in the mount 300. The camera body 200 and the lens apparatus 100 can communicate with each other via a communication terminal included in the mount 300.

The lens apparatus 100 may include a field lens unit 101, a movable zoom lens unit 102 for magnification, a diaphragm unit 103 for adjusting the amount of light, an image shake correction lens unit 104, and a movable focus lens unit 105 for focus adjustment. Each of these lens unit may include a single lens. For ease of explanation, each lens unit may be simply referred to as a lens. The zoom lens unit 102 and the focus lens unit 105 are each held by a lens holding frame (not illustrated). The lens holding frame is movable along a guide axis (along an optical axis indicated by a dashed line in the drawings), not illustrated.

The zoom lens unit 102 is moved along the optical axis via a zoom lens drive unit 106, and the position of the zoom lens unit 102 is detected by a zoom lens detection unit 107. The focus lens unit 105 is moved along the optical axis through a focus lens drive unit 111, and the position of the focus lens unit 105 is detected by the focus lens detection unit 112. The diaphragm unit 103 includes a diaphragm blade to be driven via a diaphragm drive unit 108, and adjusts the amount of light. An F-number of the diaphragm unit 103 is detected by a diaphragm detection unit 109. The image shake correction lens unit 104 is moved along a direction orthogonal to the optical axis through an image shake correction lens drive unit 110, and reduces image blurring (referred to as image shake) caused by camera motion or the like. The position of the image shake correction lens unit 104 is detected by an image shake correction lens detection unit 121.

Each of the zoom lens drive unit 106, the focus lens drive unit 111, the diaphragm drive unit 108, and the image shake correction lens drive unit 110 includes an actuator such as an ultrasonic motor. The actuator is not limited to an ultrasonic motor, but instead may be a voice coil motor, a direct current (DC) motor, and a stepping motor. A motion sensor 120 is a sensor that detects a shake (oscillation) of the lens apparatus 100. The motion sensor 120 is, for example, an angular velocity sensor including a gyroscope.

A microcomputer 113 (also referred to as a lens microcomputer or a processor) includes a storage unit 114, an estimation unit 115, a control unit 116, a communication unit 117, and a determination unit 118 (also referred to as a lens apparatus information determination unit). Here, the storage unit 114 stores machine learning parameters. The estimation unit 115 (generation unit) estimates (generates) a control signal for controlling the focus lens drive unit 111 for the focus lens unit 105. The control unit 116 controls the respective positions of the zoom lens unit 102, the diaphragm unit 103, and the image shake correction lens unit 104. For example, the control unit 116 generates a control signal for a drive unit which responds to a proportional-integral-derivative controller (PID control) based on a deviation between a target position or speed of a control target and the position or speed of the control target. The communication unit 117 communicates with the camera body 200. The determination unit 118 determines input information about the lens apparatus 100. The input information is used for estimation (generation) by the estimation unit 115. The machine learning parameters and the input information will be described below.

The camera body 200 may include an image pickup element 201, an analog-to-digital (A/D) conversion circuit 202, a signal processing circuit 203, a recording unit 204, a microcomputer 205 (also referred to as a camera microcomputer or a processor), and a display unit 206. The image pickup element 201 is an image pickup element that picks up an image formed by the lens apparatus 100. The image pickup element 201 may include a charge-coupled device (CCD) sensor or a complementary metal-oxide semiconductor (CMOS) sensor. The A/D conversion circuit 202 converts an analog signal (electric signal) output from the image pickup element 201 into a digital signal. The signal processing circuit 203 convers the digital signal output from the A/D conversion circuit 202 into video (image) data. The recording unit 204 records the video data output from the signal processing circuit 203. The display unit 206 displays the video data output from the signal processing circuit 203. An operation unit 207 is used for a user to operate the camera. The processor 205 of the camera body 200 performs control in the camera body 200. The processor 205 includes a communication unit 208 and a control unit 209. The communication unit 208 communicates with the lens apparatus 100 via the communication unit 117. The control unit 209 sends a command to the lens apparatus 100 based on the video data output from the signal processing circuit 203 and operation information. The operation information indicates an operation performed by the user and is output from the operation unit 207. The communication unit 208 transmits the command from the control unit 209 to the lens apparatus 100.

<Recording and Display of Video Image>

Recording and display of a video image in the configuration example illustrated in FIG. 2 will now be described. Light incident on the lens apparatus 100 forms an image on the image pickup element 201 through the field lens unit 101, the zoom lens unit 102, the diaphragm unit 103, the image shake correction lens unit 104, and the focus lens unit 105. The image is converted into an electric signal by the image pickup element 201. The electric signal is converted into a digital signal by the A/D conversion circuit 202. The digital signal is converted into video data by the signal processing circuit 203. The video data is recorded on the recording unit 204. The display unit 206 displays a video image based on the video data.

<Focus Control>

Focus control of the lens apparatus 100 by the camera body 200 will now be described. The control unit 209 performs auto-focus control (AF control) based on the video data output from the signal processing circuit 203. The control unit 209 performs control such that, for example, the focus lens unit 105 is moved based on the contrast of the video data so that an object is in focus. The control unit 209 outputs a command related to the movement of the focus lens unit 105 to the communication unit 208. In response to receiving the command from the control unit 209, the communication unit 208 converts the command into a control command and transmits the control command to the lens apparatus 100 via a communication contact point of the mount 300. The communication unit 117 converts the control command received from the communication unit 208 into the above-described command, and outputs the command to the estimation unit 115. In response to receiving the command as an input, the estimation unit 115 generates a control signal based on a plurality of inputs including the input by using trained machine learning parameters stored in the storage unit 114, and outputs the control signal to the focus lens drive unit 111 for the focus lens unit 105. The plurality of inputs includes information about the position of the focus lens unit 105 detected by the focus lens detection unit 112 for the focus lens unit 105, and input information about the lens apparatus 100 determined by the determination unit 118. The input information and a method in which the estimation unit 115 generates the control signal will be described below. With the above-described configuration, the focus lens unit 105 is moved based on the command from the control unit 209 so as to maximize the contrast of the video data, thus achieving appropriate AF control.

<Diaphragm Control>

Diaphragm control of the lens apparatus 100 by the camera body 200 will now be described. The control unit 209 performs diaphragm control (exposure control) processing based on the video data output from the signal processing circuit 203. More specifically, the control unit 209 determines a target F-number such that a luminance value of the video data is set to be constant. The control unit 209 outputs the determined F-number as a command to the communication unit 208. The communication unit 208 converts the command received from the control unit 209 into a control command, and transmits the control command to the lens apparatus 100 through the communication contact point of the mount 300. The communication unit 117 converts the control command received from the communication unit 208 into a command related to the F-number, and outputs the command to the control unit 116. The control unit 116 determines a control signal based on the command and the F-number of the diaphragm unit 103 detected by the diaphragm detection unit 109, and outputs the control signal to the diaphragm drive unit 108. The above-described configuration achieves such an appropriate exposure control that the F-number is controlled such that the luminance value of the video data is set to be constant.

<Zoom Control>

Zoom control of the lens apparatus 100 by the camera body 200 will now be described. The user performs a zooming operation on the lens apparatus 100 via the operation unit 207. The control unit 209 outputs a command (e.g., a speed command) for moving the zoom lens unit 102 to the communication unit 208 based on an amount of zooming operation performed by the user. The amount of zooming operation is output from the operation unit 207. The communication unit 208 converts the command received from the control unit 209 into a control command, and transmits the control command to the lens apparatus 100 through the communication contact point of the mount 300. The communication unit 117 converts the control command received from the communication unit 208 into a command for zooming, and outputs the command to the control unit 116. The control unit 116 determines a control signal based on the command and the position of the zoom lens unit 102 detected by the zoom lens detection unit 107, and outputs the control signal to the focus lens drive unit 111 for the focus lens unit 105. With the above-described configuration, the zoom lens unit 102 can be moved in accordance with the user's operation on the operation unit 207.

<Image Stabilization Control>

Image stabilization control in the lens apparatus 100 will now be described. The control unit 116 determines a target position of the image shake correction lens unit 104 so as to reduce an image shake caused by a shake of the lens apparatus 100 based on a signal output from the motion sensor 120. The signal output from the motion sensor 120 relates to the shake of the lens apparatus 100. The control unit 116 determines a control signal based on the target position and the position of the image shake correction lens unit 104 detected by the image shake correction lens detection unit 121, and outputs the control signal to the image shake correction lens drive unit 110 for the image shake correction lens unit 104. With the above-described configuration, image blurring (image shake) resulting from the image pickup by the image pickup element 201 can be reduced.

<Requirements for Focus Control>

The AF control according to the present exemplary embodiment will now be described. Assume herein that requirements for the AF control include a position error, a speed, and power consumption.

<Position Error in Requirements>

The term "position error" used herein refers to an index indicating how accurately the focus lens unit 105 can be moved to a target position in the case of moving the focus lens unit 105 to the target position. The focus lens unit 105 is moved to a specific target position, so that a specific object is brought into focus. In the AF control, as the error between the target position and the actual position increases, the object in the video image is out of focus to a larger extent. As is well known, even when the error is the same, the object may appear to be in out of focus in a case where a depth of focus determined by the F-number and a circle of least confusion is shallow, while the object may appear to be in focused when the depth of focus is deep.

Figure 12A:
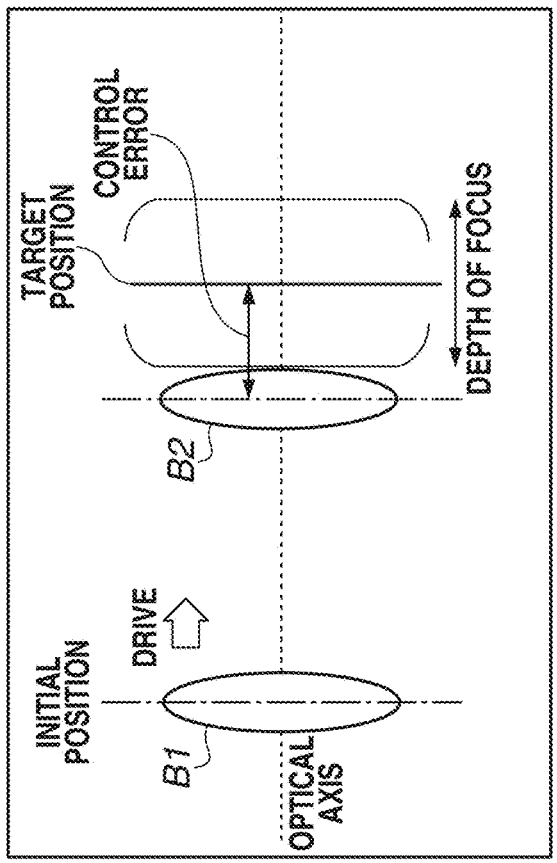
FIGS. 12A and 12B each illustrate an allowable range of a position error of a focus lens unit.
Figure 12B:
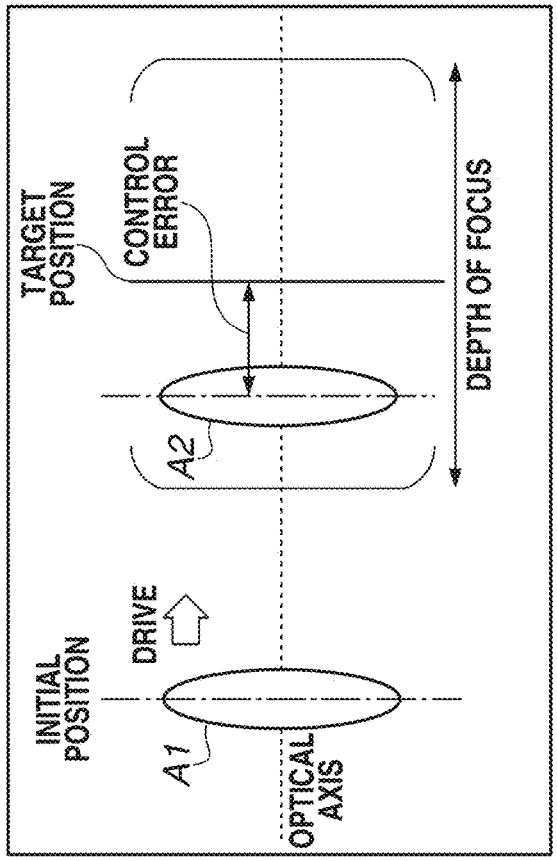

FIGS. 12A and 12B each illustrate an allowable range of the position error of the focus lens unit 105. More specifically, FIGS. 12A and 12B each illustrate the allowable range corresponding to the depth of focus in a case where the focus lens unit 105 is moved from an initial position to a target position. FIG. 12A illustrates a case where the depth of focus is deep, while FIG. 12B illustrates a case where the depth of focus is shallow. A1 and B1 each represent the initial position of the focus lens unit 105. A2 and B2 each illustrate the position of the focus lens unit 105 after the focus lens unit 105 is moved. A dashed line in each of FIGS. 12A and 12B indicates the optical axis. The focus lens unit 105 is moved along the optical axis. The depth of focus is deep in the case illustrated in FIG. 12A, and the depth of focus is shallow in the case illustrated in FIG. 12B. FIGS. 12A and 12B each illustrate a case where the focus lens unit 105 is stopped at a distance corresponding to the control error toward the target position. Assume that the initial position, the target position, and the control error in FIG. 12A are identical to those in FIG. 12B.

In the case of FIG. 12A, the position A2 of the moved focus lens unit 105 falls within the allowable range of the control error (position error) corresponding to the depth of focus, so that a video image in which a specific object is in focus is obtained. By contrast, in the case of FIG. 12B, the position B2 of the moved focus lens unit 105 falls outside of the allowable range of the control error corresponding to the depth of focus, so that a video image in which the specific object is out of focus is obtained. Thus, even in a case where the control error (position error) is the same, the allowable range of the control error varies depending on the depth of focus. Accordingly, the ratio of the control error to the allowable range also varies. The depth of focus, which is a parameter for evaluating the position of an image plane, can be converted into a parameter for evaluating the position of the focus lens unit 105 or the control error (position error) by using focus sensitivity expressed in the following Expression (1).

$$[\text{shift amount of image plane}] = [\text{focus sensitivity}] \times [\text{shift amount of focus lens unit}] \quad (1)$$

In Expression (1), the focus sensitivity is a value that varies depending on the position of the focus lens unit 105 and the position of the zoom lens unit 102. The depth of focus varies depending on the F-number. Accordingly, the control error (position error) of the focus lens unit 105 that is obtained for focusing on the specific object varies depending on the position of the focus lens unit 105, the position of the zoom lens unit 102, and the position of the diaphragm unit 103 (a state of a specific optical member in the lens apparatus 100).

<Speed in Requirements>

The term "speed", which is one of the requirements described above, refers to a movement speed when the focus lens unit 105 is moved. As the speed, a predetermined shift amount per unit time may also be used. Assuming that a shift amount of a plane (image plane) on which an object is in focus is regarded as an image plane shift amount and the movement speed of this plane is regarded as an image plane movement speed, the shift amount of the focus lens unit 105 can be regarded as being proportional to the image plane shift amount. However, the proportional constant can vary depending on the state of each optical system included in the lens apparatus 100 (depending on a positional relationship among a plurality of optical members). The proportional constant corresponds to the focus sensitivity in expressed in the above-described Expression (1).

Even if the focus lens unit 105 is shifted by the same amount, when the focus sensitivity is high due to the state of the lens apparatus 100, the image plane shift amount is relatively large, and when the focus sensitivity is low, the image plane shift amount is relatively small. Thus, the focus lens unit 105 is to be moved by the amount corresponding to the shift amount of the focus lens unit 105 obtained by using Expression (1) so that the focus lens unit 105 can be moved such that the image plane shift amount is set to be constant. Further, in the case of controlling the image plane movement speed in a state where a moving object is constantly in focus, the allowable range of the error between a target image plane movement speed and an actual movement speed of the image plane can be determined based on the depth of focus.

Here, the focus sensitivity varies depending on the position of the focus lens unit 105 and the position of the zoom lens unit 102 as described above. In addition, the depth of focus varies depending on the F-number. Thus, a certain movement speed of the image plane, or a movement speed of the focus lens unit 105 that is required for, for example, following an object, varies depending on the position of the focus lens unit 105, the position of the zoom lens unit 102, and the state of the diaphragm unit 103.

In some cases, the volume of sound which occurs with the driving of the focus lens unit 105 and which can be recorded in capturing a video image may be demanded to be set to less than or equal to a specific volume (threshold). In such a case, the movement speed of the focus lens unit 105 may be set to less than or equal to a specific threshold.

<Power Consumption in Requirements>

The term "power consumption" used herein refers to power to be consumed when the focus lens unit 105 is driven. The power consumption varies depending on a time period and speed for moving the focus lens unit 105.

By reducing the power consumption, a battery capacity can be effectively used. For example, the number of images that can be captured and operation time for capturing images once the battery is charged can be increased, which leads to a reduction in the size of the battery.

When specific requirements for the position error, speed, and power consumption described above are satisfied, for example, focusing for the user can be achieved. The plurality of requirements may have a tradeoff relationship. For example, the position error and the power consumption may have a tradeoff relationship. When the depth of focus is deep, the effect of a positional deviation of the focus lens unit 105 on focusing is smaller than that when the depth of focus is shallow. Accordingly, the power consumption can be reduced by allowing the control error as long as the position error of the focus lens unit 105 falls within the allowable range corresponding to the depth of focus. On the contrary, when the depth of focus is shallow, the effect of the positional deviation of the focus lens unit 105 on focusing is large. Accordingly, if the control error is reduced so that the position error of the focus lens unit 105 falls within the allowable range corresponding to the depth of focus, the power consumption increases.

In the case of performing focusing control such that an object is continuously brought into focus, an error (also referred to as a control error or control deviation) between the target position of the focus lens unit 105 and the actual position of the focus lens unit 105 is to be set so that the error continuously falls within the allowable range corresponding to the depth of focus. To achieve this, for example, control can be performed such that, in a specific range within the allowable range of the control error, the movement speed of the focus lens unit 105 is set to relatively low, and in a range exceeding the specific range, the movement speed of the focus lens unit 105 is set to relatively high. In such a case, the power consumption can be reduced as the movement speed of the focus lens unit 105 decreases. Here, the allowable range can be determined based on the depth of focus. In addition, the relationship between the movement speed of the focus lens unit 105 and the image plane movement speed can be determined based on the focus sensitivity. Accordingly, the movement speed of the focus lens unit 105 for continuously focusing on an object can be determined based on the position of the focus lens unit 105, the position of the zoom lens unit 102, and the state of the diaphragm unit 103.

With the above-described configuration, the control signal for controlling the focus lens drive unit 111 for the focus lens unit 105 can be changed based on the requirements for the position error, speed, and power consumption, which are associated with the movement of the focus lens unit 105.

<Determination of Control Signal by Estimation Unit 115>

Figure 4:
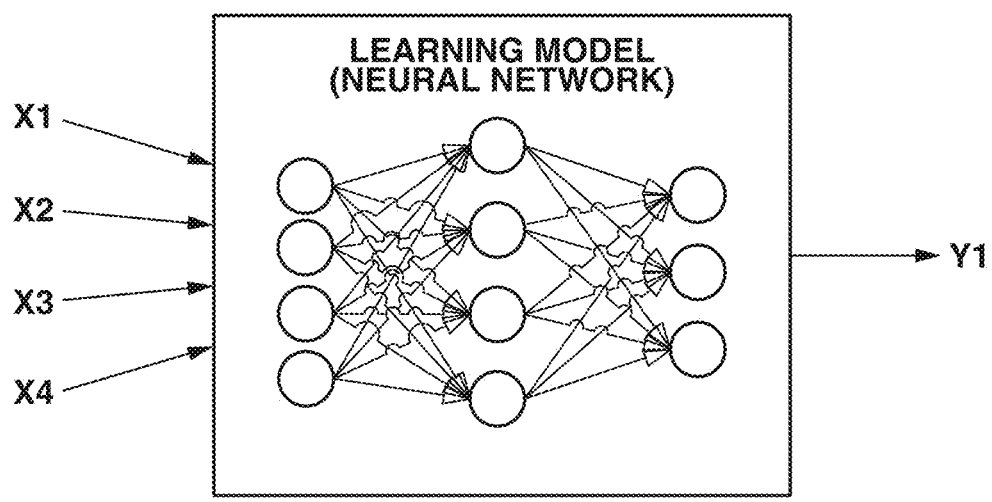
FIG. 4 illustrates inputs to and an output from a neural network.

A neural network (also referred to as NN) is implemented in the estimation unit 115. The estimation unit 115 refers to the machine learning parameters stored in the storage unit 114 and determines a control signal based on an NN algorithm using the machine learning parameters. FIG. 4 illustrates inputs to and an output from the neural network. In the NN, which is a learning model (trained model) according to the first exemplary embodiment, an input X1 represents a target position of the focus lens unit 105 and is output from the communication unit 117. An input X2 represents an actual position of the focus lens unit 105 and is obtained from the focus lens detection unit 112. An input X3 represents a depth of focus as information related to the lens apparatus 100. An input X4 represents focus sensitivity, which is information related to the lens apparatus 100. An output Y1 represents a control signal for controlling the focus lens drive unit 111 for the focus lens unit 105. Here, information related to optical characteristics of the lens apparatus 100, such as the depth of focus and focus sensitivity, can be determined by the determination unit 118 depending on specific information (e.g., the circle of least confusion, F-number, the position of focus lens unit 105, and the position of zoom lens unit 102). The control signal for controlling the focus lens drive unit 111 for the focus lens unit 105 is generated based on the trained model including the inputs and the output as described above.

<Configuration of Learning Unit>

FIG. 3 is a block diagram illustrating a configuration example of the system for learning. Referring to FIG. 3, a communication unit 122 (also referred to as a personal computer (PC) communication unit) is a communication unit for communicating with a PC 400 (also referred to as an information processing apparatus). The PC 400 includes a processor (a central processing unit (CPU) or a graphics processing unit (GPU)) and a storage device (a read-only memory (ROM), a random access memory (RAM), or a hard disk drive (HDD)). The storage device stores programs, data, and the like to be used for the processor to execute operations. A communication unit 404 is used for communicating with the communication unit 122. A learning unit 403 (also referred to as a machine learning unit) performs learning processing by obtaining an input and an output in the estimation unit 115. The learning processing will be described in detail below.

The learning unit 403 and the communication unit 404 in the PC 400 can be implemented such that an execution program stored in the HDD is loaded into the memory (ROM or RAM) and the loaded program is executed by hardware resources, such as the CPU. Rules for setting a reward for enforced learning are described in the program. The rules will be described below.

The communication unit 404 receives information about an operation log of the lens apparatus 100 from the communication unit 122 of the lens apparatus 100. The operation log includes an input and an output in the estimation unit 115. The information about the operation log is input to the learning unit 403. The learning unit 403 performs machine learning based on the information about the operation log, and outputs parameters for the machine learning. A learning method used by the learning unit 403 will be described below. The machine learning parameters output from the learning unit 403 are transmitted to the lens apparatus 100 via the communication unit 404. The machine learning parameters received by the communication unit 122 are stored in the storage unit 114. The machine learning parameters stored in the storage unit 114 are referred to by the estimation unit 115 and are reflected in the NN algorithm of the estimation unit 115. The estimation unit 115 outputs a control signal based on the NN algorithm, and the focus lens drive unit 111 drives the focus lens unit 105 based on the control signal.

Here, the GPU is feasible of effectively performing parallel processing of data, and thus is effective in a case where learning is repeatedly performed using a learning model such as a learning model used for deep learning. Accordingly, in the processing performed by the learning unit 403, the GPU can be used in place of or in addition to the CPU. For example, a learning program including a learning model may be desirably executed by the CPU and the GPU in cooperation. The processing performed by the learning unit 403 may be executed using the GPU.

<Method for Generating Trained Machine Learning Parameters by Learning Unit 403>

Next, a learning method using machine learning parameters (method for generating trained machine learning parameters) to be executed by the learning unit 403 according to the present exemplary embodiment will be described. The machine learning parameters are learned in the system illustrated in FIG. 3. The system includes the lens apparatus 100 and the PC 400 as described above.

Figure 5:
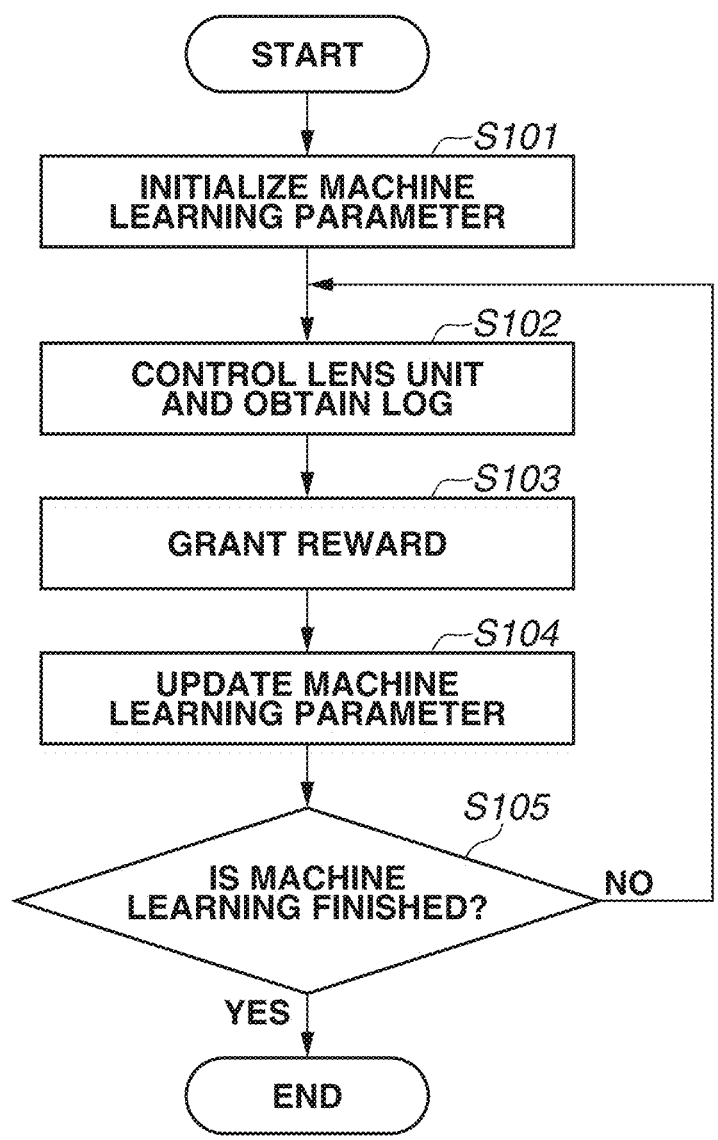
FIG. 5 is a flowchart for learning.

The estimation unit 115 incorporates a program for generating a control signal for moving the focus lens unit 105 from a start position to a stop position in a predetermined specific pattern for learning. The focus lens unit 105 is controlled based on this program. The control and learning associated with the control are repeatedly performed, so that the machine learning parameters in the control unit 116 are overwritten by the PC 400. FIG. 5 illustrates a flowchart for learning. Each step in FIG. 5 can be executed by the learning unit 403 of the PC 400 or the estimation unit 115 of the lens apparatus 100.

In FIG. 5, first, in step S101 (initialization of a machine learning parameter), the learning unit 403 transmits an initial value (e.g., "0") of the machine learning parameter to the lens apparatus 100 via the communication unit 404. In step S102 (lens unit control and log obtainment), the estimation unit 115 moves the focus lens unit 105 from a predetermined start position to a predetermined stop position. The communication unit 122 can obtain a control signal, a control amount, a depth of focus, focus sensitivity, and power consumption as a log related to the control of the focus lens unit 105. The control signal can be obtained from the estimation unit 115. The control amount (position in this case) can be obtained from the focus lens detection unit 112. The depth of focus and focus sensitivity can be obtained from the determination unit 118. The power consumption in the focus lens drive unit 111 can be obtained from the focus lens drive unit 111. The power consumption in the focus lens drive unit 111 can be obtained from a current detected by a current detector provided in a power supply of a motor. The log as described above is transmitted from the communication unit 122 to the PC 400.

Next, in step S103 (granting of reward), the learning unit 403 grants a reward for the control associated with the log based on rules preliminarily stored in a storage unit 410 (also referred to as a data storage unit) or the like. The rules will be described below. Next, in step S104, the learning unit 403 updates the machine learning parameter so as to maximize the reward. The machine learning parameter can be updated by backpropagation. However, the method for updating the machine learning parameter is not limited to backpropagation. After the updated machine learning parameter is stored in the storage unit 410, the updated machine learning parameter is stored in the storage unit 114 via the communication unit 404 and the communication unit 122. In step S105, an update unit 412 (also referred to as a data update unit) determines whether the learning of the machine learning parameter is finished. Whether or not machine learning is finished can be determined, for example, based on whether the number of repetitions of machine learning (updates of the machine learning parameter) has reached a threshold, or based on whether a variation of the reward in machine learning is less than a threshold. If the update unit 412 determines that machine learning is not finished (NO in step S105), the processing returns to step S101. If the update unit 412 determines that machine learning is finished (YES in step S105), the learning unit 403 causes the storage unit 400 to store information about the machine learning parameter obtained by machine learning, and then the processing is terminated.

Examples of the machine learning algorithm include a nearest neighbor algorithm, Naive Bayes method, a decision tree, a support vector machine, and deep learning using a neural network. The algorithm is not limited to these examples, and any available algorithm can be appropriately selected and applied.

<Reward Setting Method>

A reward setting method will now be described. Assume herein that rules for the reward to be granted are determined individually for three items of "position error", "speed error", and "power consumption", and the rules for the three items are summed up. A permissible amount of each of the position error and the speed error varies depending on the depth of focus and focus sensitivity, and thus the position error and the speed error are set based on a ratio thereof to the permissible amount in this case. For example, a higher reward (score) is granted as the ratio is lower than 100%, and a lower reward (score) is granted as the ratio is higher than 100%. The position error is a difference between a target position and an actual position. The target position is a target control amount determined by the estimation unit 115, and can be obtained from the log. The actual position can be obtained from the log through the detector. Here, the speed error is a difference between a target image plane movement speed and an actual image plane movement speed, and can be obtained or calculated from the log.

For example, the target image plane movement speed can be calculated by the estimation unit 115 from the log (history) of the generated target position. The actual image plane movement speed can be obtained from the focus sensitivity and the movement speed of the focus lens unit 105, which are obtained from the log, by the following Expression (2) obtained by substituting the shift amount in Expression (1), which can be calculated from the log (history) of the actual image plane position for the speed.

$$[\text{image plane movement speed}]=[\text{focus sensitivity}]\times[\text{movement speed of focus lens unit}] \quad (2)$$

A higher reward is granted as the power consumption is less than a predetermined upper limit. To obtain the machine learning model, the reward determined for the above-described three items can be used.

<Correlation Between Input Data and Output Data in Machine Learning Model>

By setting the reward as described above, parameters for the machine learning model that is advantageous in terms of focusing performance and power consumption can be adjusted. Input data for the machine learning model (neural network in this case) includes information having a correlation with a control signal for each drive unit as output data for the machine learning model. The shift amount of the focus lens unit 105 to be used for focusing is obtained based on the target position and the actual position. The allowable range of the error of the actual position with respect to the target position is determined based on the depth of focus. Accordingly, it is expected that a control signal can be obtained by setting a higher reward as the error decreases within the allowable range. Further, since the shift amount of the focus lens unit 105 can be replaced by the image plane shift amount, it is expected that a suitable control signal can be obtained by setting a higher reward as the error of the image plane shift amount or image plane movement speed with respect to a target image plane shift amount or image plane movement speed decreases.

Advantageous Effects of Present Exemplary Embodiment

In typical lens control, an algorithm is built for switching (branching) control operations depending on conditions individually provided based on requirements for the position error, the speed error, and the power consumption.

More specifically, an allowable range of a position error is set for each range of the depth of focus or focus sensitivity. Accordingly, the control signal is discontinuously changed according to switching of the range, which makes it difficult to perform seamless control. In the present exemplary embodiment, the control signal does not depend on such conditional branching, but instead depends on the machine learning model as described above, so that the control signal with which a change in the position, speed, and power consumption is seamless can be output. Thus, according to the present exemplary embodiment, it is possible to provide a lens apparatus that is advantageous in terms of continuity of a change in control operations or a change in an image.

<Other Control Targets>

The control target according to the present exemplary embodiment is not limited to the focus lens unit 105, but instead may be, for example, the zoom lens unit 102, the image shake correction lens unit 104, or an aperture stop. In such cases, information (information set) having a correlation with the control signal to be output may be selected as information (information set) related to the lens apparatus 100 to be input to the machine learning model (e.g., neural network). For example, information (information set) including a rotational angle of a zoom operation ring, a focal length, and a luminance may be selected. Thus, the above-described advantageous effects produced by the present exemplary embodiment can be obtained also in the control as described above.

For example, in a case where the machine learning model is applied to a zoom lens drive control operation, a control signal for controlling the zoom lens drive unit 106 for the zoom lens unit 102 with which a change rate of the angle view (a change rate of the angle of view per unit time) becomes constant can be obtained based on information about the target position and the angle of view with respect to the zoom lens unit 102. In such a case, a higher reward may be set as the change rate of the angle of view approaches a constant value. Additionally, in a case where the machine learning model is applied to an aperture stop drive control operation, a control signal for controlling the drive unit for the aperture stop based on (in compatible with) a change in luminance of a video image can be obtained using the luminance of the video image and the F-number as inputs. For example, even if the aperture stop is driven with the same drive amount, in a case where the luminance is high and the F-number is small, the luminance changes more rapidly than in a case where the luminance is low and the F-number is large, which provides a feeling of strangeness to the user who is viewing the video image. In such a case, a higher reward can be set as the change in luminance decreases. Further, in a case where the machine learning model is applied to a drive control operation for the image shake correction lens unit 104, a control signal for controlling the image shake correction lens drive unit 110 for the image shake correction lens unit 104 based on the focal length can be obtained using the focal length and the shift amount of the video image as inputs. Even if the image shake correction lens unit 104 is shifted by the same shift amount, in a case where the focal length is long, the shift amount of the video image increases, and thus, the image shake correction lens unit 104 is to be rapidly driven. In such a case, a higher reward can be set as the position error of the image shake correction lens unit 104 decreases. The output of the motion sensor 120 that includes the gyroscope is not stabilized for a certain period of time after the power supply is turned on. Accordingly, a control signal for controlling the image shake correction lens drive unit 110 for the image shake correction lens unit 104 based on a time after start-up of the motion sensor 120 can be obtained using the time as an input. In such a case, a lower reward can be set as a drift of an output from the motion sensor 120 increases. Further, by using information about a shift vector (motion vector) for the video image obtained from the image pickup apparatus as input, a control signal for controlling the image shake correction lens drive unit 110 for the image shake correction lens unit 104 based on the shift vector can be obtained. In such a case, a higher reward can be set as the absolute value of the shift vector decreases.

An orientation (tilt), temperature, and surrounding sound volume of the lens apparatus 100 are also useful as input to the machine learning model. The orientation varies the effect of a gravitational force acting when a lens or diaphragm is driven, so that a driving torque for the drive unit is also varied. The temperature varies characteristics of lubricant in the drive unit, so that the driving torque for the drive unit is also varied. The surrounding sound volume restricts the drive speed by restricting drive sound of the drive unit. Accordingly, by inputting the quantity of state as described above, a control signal for controlling the drive unit based on (in compatible with) the quantity of state can be obtained.

Second Exemplary Embodiment

<Exemplary Embodiment for Multigroup Control (Multiple Models)>

Figure 6:
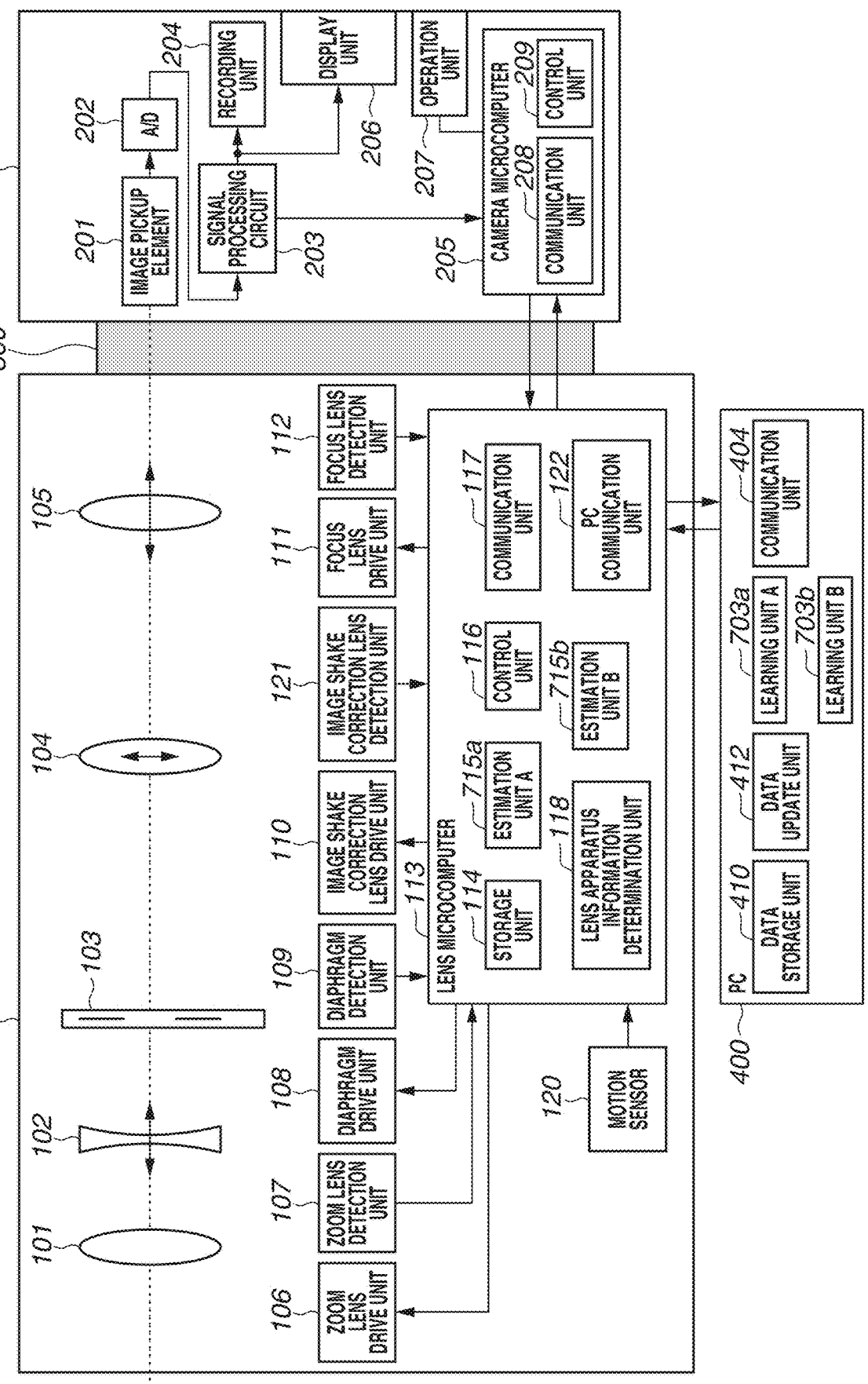
FIG. 6 is a block diagram illustrating a configuration example of a system for learning according to a second exemplary embodiment.

A second exemplary embodiment relates to a system for controlling a plurality of lens units in parallel and illustrates an example of a cooperative control operation by the zoom lens unit 102 and the focus lens unit 105. According to the second exemplary embodiment, in a case where image capturing conditions are determined by two optical members, a control signal for controlling a drive unit for one of the optical members is obtained by inputting control information also about the other optical members to the machine learning model (neural network in this case). As in the first exemplary embodiment, the second exemplary embodiment is also applicable to a cooperative control operation using a combination of optical members other than the combination of the focus lens unit 105 and the zoom lens unit 102. FIG. 6 is a block diagram illustrating a configuration example of a system for learning according to the second exemplary embodiment. The second exemplary embodiment differs from the first exemplary embodiment in that at least one of the inputs to the neural network that outputs a control signal for controlling the drive unit for one of the lens units represents the position of the other lens unit. Differences between the configuration example illustrated in FIG. 6 and the configuration example of the first exemplary embodiment will be described.

The lens microcomputer 113 (also referred to as the processor) includes an estimation unit A 715a and an estimation unit B 715b (i.e., a number of estimation units corresponding to the number of lens units to be controlled, i.e., two estimation units in this case). The estimation unit A 715a estimates (outputs) a control signal for controlling the focus lens drive unit 111 for the focus lens unit 105, and the estimation unit B 715b estimates (outputs) a control signal for controlling the zoom lens drive unit 106 for the zoom lens unit 102. The estimation unit A 715a determines a target position of the focus lens unit 105 from the position of the zoom lens unit 102 based on a drive command supplied from the camera body 200, and outputs (generates) a control signal for controlling the focus lens drive unit 111 for the focus lens unit 105 based on the target position. The estimation unit A 715a preliminarily holds table information indicating a relationship among an object distance, the position of the zoom lens unit 102, and the position of the focus lens unit 105, and determines the target position of the focus lens unit 105 based on the table information. The determined target position of the focus lens unit 105 is input to the NN algorithm in which machine learning parameters are learned. The focus lens drive unit 111 that has received the control signal as an output from the estimation unit A 715a moves the focus lens unit 105 along the optical axis. By contrast, the estimation unit B 715b obtains a control signal for controlling the zoom lens drive unit 106 for the zoom lens 102, and the zoom lens drive unit 106 that has received the control signal as an output from the estimation unit B 715b moves the zoom lens 102 along the optical axis. The storage unit 114 stores the trained machine learning parameters used for each of the estimation unit A 715a and the estimation unit B 715b.

Next, differences between a machine learning parameter learning method (method for generating a trained machine learning model) to be executed by learning units 703 according to the second exemplary embodiment and that of the first exemplary embodiment will be described. The estimation unit A 715a, a control unit A 716a, and a learning unit A 703a function in control for the zoom lens unit 102, and the estimation unit B 715b, a control unit B 716b, and a learning unit B 703b function in control for the focus lens unit 105.

Figure 7:
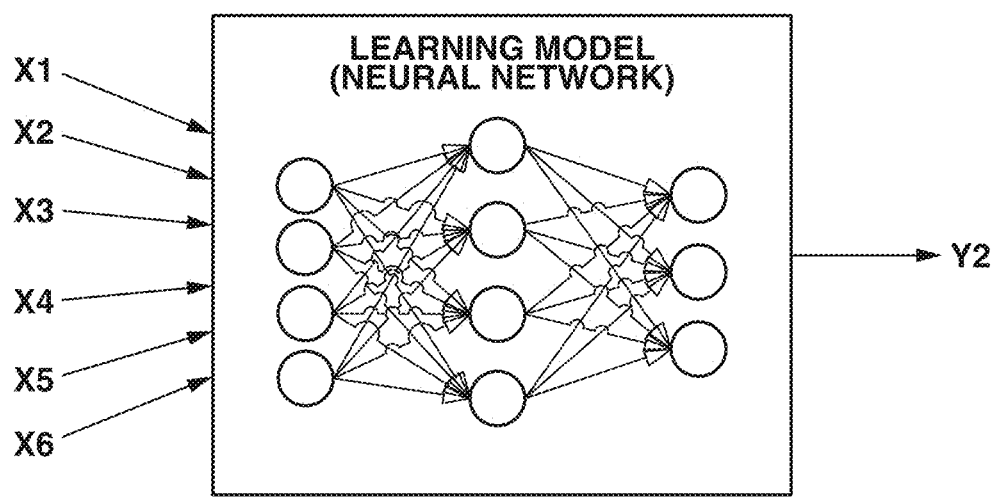
FIG. 7 illustrates inputs to and an output from a neural network for zooming.

FIG. 7 illustrates inputs to and an output from a neural network for zooming. The example illustrated in FIG. 7 is the neural network (machine learning model) in the estimation unit A 715a. Information (X1 to X6) to be input will now be described below. X1 represents a target position of the focus lens unit 105 determined by the control unit 116. X2 represents an actual position (current position) of the focus lens unit 105 obtained from the focus lens detection unit 112. X3 represents a depth of focus of the lens apparatus 100. X4 represents focus sensitivity of the lens apparatus 100. X5 represents a target position of the zoom lens unit 102 determined by the control unit 116. X6 represents an actual position of the zoom lens unit 102 obtained from the zoom lens detection unit 107. X4 (focus sensitivity) is information (value) for obtaining an image plane shift amount from a shift amount of the focus lens unit 105. Information Y2 to be output is a control signal for controlling the zoom lens drive unit 106 for the zoom lens unit 102. As is obvious from the above, information about the focus lens unit 105 as a lens unit different from the zoom lens unit 102 is input to the neural network (machine learning model) in outputting the control signal for the zoom lens unit 102.

Figure 8:
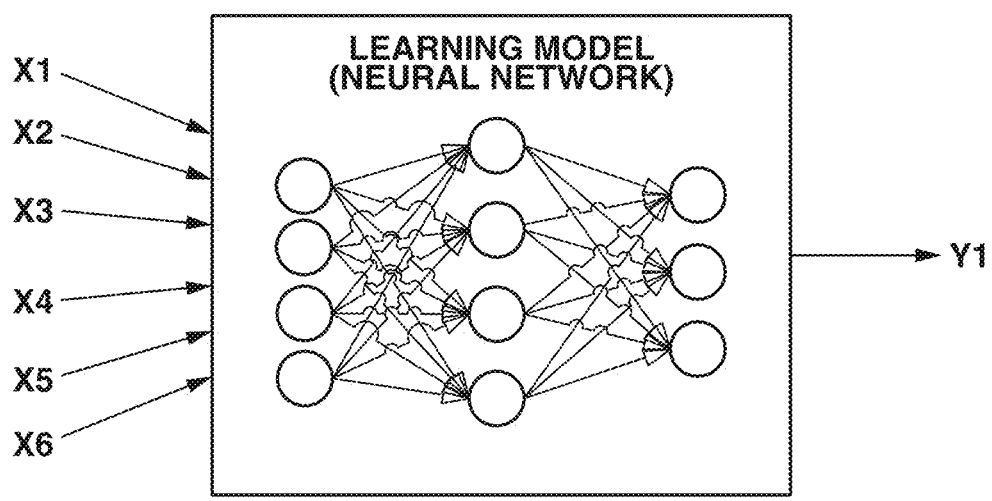
FIG. 8 illustrates inputs to and an output from a neural network for focusing.

FIG. 8 illustrates inputs to and an output from a neural network for focusing. The example illustrated in FIG. 8 is the neural network (machine learning model) in the estimation unit B 715b. Information (X1 to X6) to be input will now be described below. X1 represents a target position of the focus lens unit 105 determined by the control unit 116. X2 represents an actual position (current position) of the focus lens unit 105 obtained from the focus lens detection unit 112. X3 represents a depth of focus of the lens apparatus 100. X4 represents focus sensitivity of the lens apparatus 100. X5 represents a target position of the zoom lens unit 102 determined by the control unit 116. X6 represents an actual position of the zoom lens unit 102 obtained from the zoom lens detection unit 107. Information Y1 to be output is a control signal for controlling the focus lens drive unit 111 for the focus lens unit 105. X4 (focus sensitivity) is information (value) for obtaining an image plane shift amount from a shift amount of the zoom lens unit 102. As is obvious from the above, information about the zoom lens unit 102 as a lens unit different from the focus lens unit 105 is input to the neural network (machine learning model) in outputting the control signal for the focus lens unit.

The machine learning model (machine learning parameter) generation method can be executed by the learning unit A 703a and the learning unit B 703b in the PC 400 and by the estimation unit A 715a and the estimation unit B 715b in the processor 113. The procedure of the method may be similar to that of the first exemplary embodiment.

Advantageous Effects of Present Exemplary Embodiment

Two different trained machine learning models (neural networks) as described above according to the present exemplary embodiment are incorporated in control for the zoom lens unit 102 and control for the focus lens unit 105, respectively, thus enabling mutually cooperative control operation for the two lens units. Thus, unlike in the related art in which the zoom lens unit is caused to follow the focus lens unit, the mutually cooperative control operation for the zoom lens unit 102 and the focus lens unit 105 can be achieved in the present exemplary embodiment. Consequently, unlike in the related art, compensation for an insufficient position accuracy of the focus lens unit 105, or compensation for an insufficient speed of the zoom lens unit 102 can be achieved through control.

<Other Control Targets>

In the present exemplary embodiment, the focus control has been described, but the cooperative control operation is not limited to the focus control. For example, the present exemplary embodiment is also applicable to a cooperative control operation between the focus lens unit 105 and the zoom lens unit 102 for compensating, by the movement of the zoom lens unit 102, for a change in the angle of view (image field change) due to the movement of the focus lens unit 105. Further, the present exemplary embodiment is also applicable to a cooperative control operation between the zoom lens unit 102 and the aperture stop for compensating, by adjusting the opening degree of the aperture stop, for a change in the F-number due to the movement of the zoom lens unit 102. Furthermore, the present exemplary embodiment is also applicable to a cooperative control operation between a plurality of control systems for performing image shake correction, such as a cooperative control operation between a plurality of image shake correction lenses for image shake correction, a cooperative control operation between the image shake correction lens unit 104 and an image shake correction image pickup element, or a cooperative control operation between the image shake correction lens unit 104 and image shake correction image processing.

Third Exemplary Embodiment

<Exemplary Embodiment for Multigroup Control (One Model)>

As in the second exemplary embodiment, a third exemplary embodiment also relates to a system for controlling a plurality of lens units in parallel. The third exemplary embodiment differs from the second exemplary embodiment in that processing for controlling the plurality of lens units in parallel is performed using a single machine learning model (neural network in this case). An example of focus control will be described below.

Figure 9:
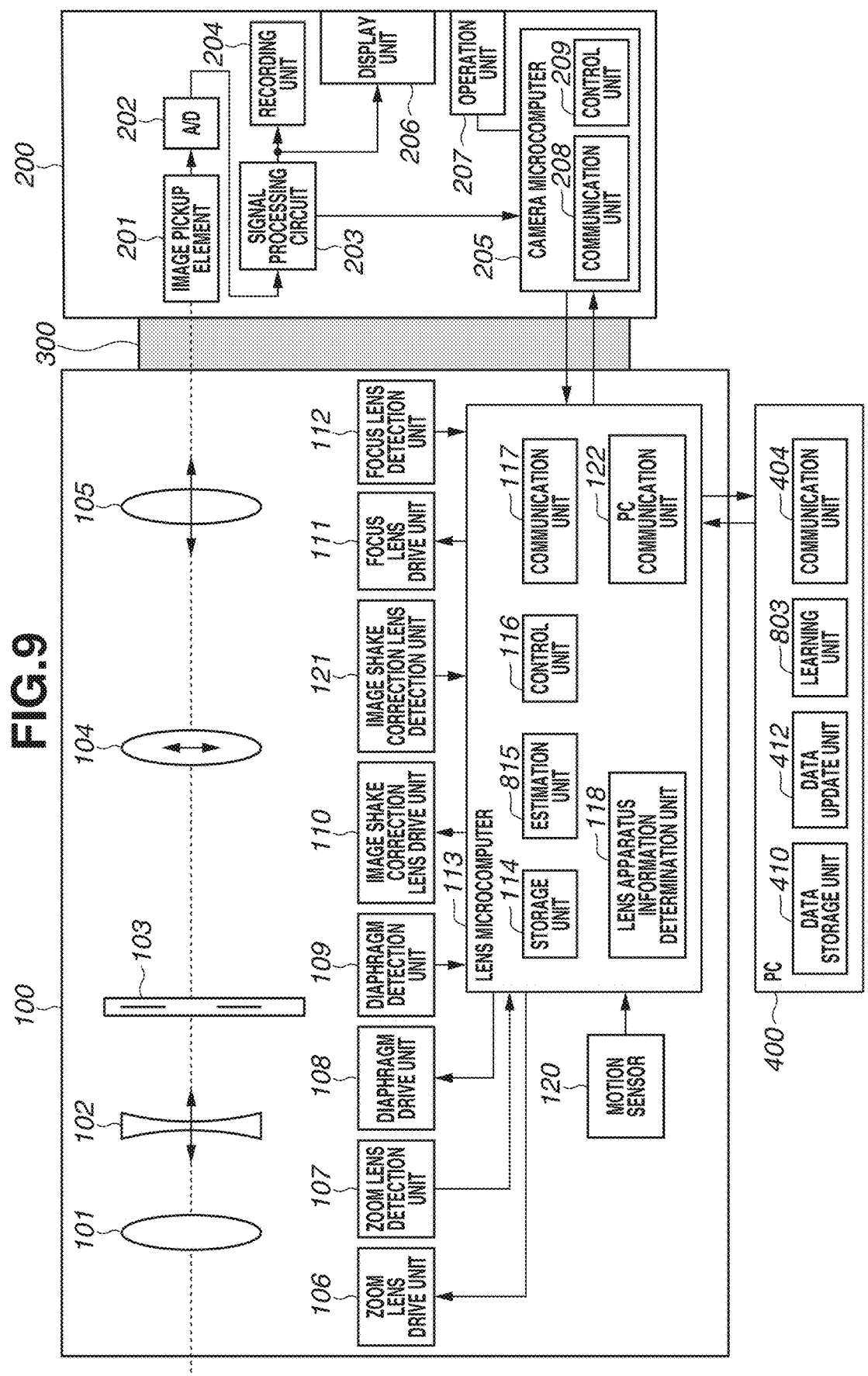
FIG. 9 is a block diagram illustrating a configuration example of a system for learning according to a third exemplary embodiment.

The present exemplary embodiment relates to a case where an image capturing condition (an in-focus state or an object distance in this case) is determined based on two lens units. In this case, a single machine learning model (neural network in this case) that receives information about the two lens units as inputs and outputs control signals for controlling drive units for the two lens units. FIG. 9 is a block diagram illustrating a configuration example of a system for learning according to the third exemplary embodiment. Differences between the third exemplary embodiment and the first and second exemplary embodiments will be described below. An estimation unit 815 included in the processor 113 includes a single machine learning model (neural network in this case). Information about the lens apparatus 100 to be input to thus neural network includes positional information about the zoom lens unit 102 and the focus lens unit 105, and information to be output from the neural network indicates control signals for controlling the drive units for the two lens units. The zoom lens unit 102 and the focus lens unit 105 are controlled in parallel based on these control signals.

As described above, the estimation unit 815 outputs the control signals for the zoom lens unit 102 and the focus lens unit 105, respectively, in parallel. Based on the control signals, the focus lens drive unit 111 moves the focus lens 105 and the zoom lens drive unit 106 moves the zoom lens 102 along the optical axis. The storage unit 114 stores trained machine learning parameters to be used by the estimation unit 815.

Figure 10:
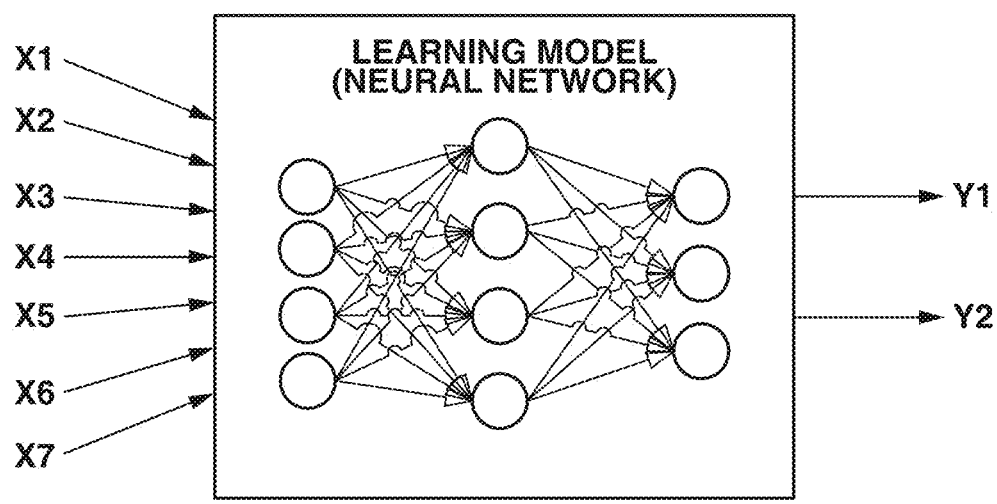
FIG. 10 illustrates inputs to and outputs from a neural network.

Differences between a machine learning parameter learning method (method for generating a trained machine learning model) to be executed by a learning unit 803 according to the third exemplary embodiment and that of the first exemplary embodiment will now be described. The estimation unit 815 incorporates a learning program for generating commands for the zoom lens drive unit 106 and the focus lens drive unit 111 based on a predetermined specific change pattern. Information input to the estimation unit 815 and information output from the estimation unit 815 are obtained as a log when the learning program is operated. FIG. 10 illustrates inputs to and outputs from the neural network. An example of information about inputs to the neural network will now be described below. X1 represents a command for the focus lens unit 105 determined by the control unit 116. X2 represents an actual position (current position) of the focus lens unit 105 obtained from the focus lens detection unit 112. X3 represents a depth of focus of the lens apparatus 100. X4 represents the above-described focus sensitivity of the lens apparatus 100. X5 represents a command for the zoom lens unit 102 determined by the control unit 116. X6 represents an actual position of the zoom lens unit 102 obtained from the zoom lens detection unit 107. X7 represents focus sensitivity associated with the movement of the zoom lens unit 102 ("focus sensitivity" obtained by substituting [shift amount of focus lens unit] for [shift amount of zoom lens unit] in the above-described Expression (1)). Y1 represents a control signal for the focus lens drive unit 111. Y2 represents a control signal for the zoom lens drive unit 106. The above-described trained machine learning model generation method can be executed by the learning unit 803 of the PC 400 and the estimation unit 815 of the processor 113. The procedure of the generation (learning) processing may be similar to that of the first exemplary embodiment (FIG. 5).

Advantageous Effects of Present Exemplary Embodiment

According to the present exemplary embodiment, the cooperative control operation using two lens units can be performed by using a single machine learning model (neural network). If there are some processes that are common to the control of the zoom lens unit 102 and the control of the focus lens unit 105, these processes can be integrated into one process in the neural network, which leads to a reduction in load on the processor 113. Thus, the present exemplary embodiment is more advantageous in terms of reduction of processing time for the estimation unit 815 than in the second exemplary embodiment. Further, the present exemplary embodiment is advantageous in terms of synchronousness of the cooperative control operation.

<Other Control Targets>

In the present exemplary embodiment, focus control has been described, but the cooperative control operation is not limited to focus control. In this regard, the third exemplary embodiment is similar to the second exemplary embodiment.

Fourth Exemplary Embodiment

<Exemplary Embodiment for Auxiliary Control>

FIG. 11 is a block diagram illustrating a configuration example of a system for learning according to a fourth exemplary embodiment. The fourth exemplary embodiment differs from the above-described exemplary embodiments in that the lens microcomputer 113 includes a control unit 1516 that performs the PID-control on the focus lens unit 105, and an estimation unit 1515 that performs an auxiliary control operation for the control to be executed by the control unit 1516. An example of focus control will be described below.

It is difficult to perform control adapted to various states or use environments of the lens apparatus 100, for example, regarding the orientation and temperature of the lens apparatus 100, the gravitational force acting on the lens apparatus 100, and lubricant in each drive unit of the lens apparatus 100, by using the PID-control. When a motion of a driving target is started and stopped, a dynamic friction and a static friction are switched, and thus it may be difficult to perform the control accurately and stably. In the image pickup apparatus, a viewer who views a video image obtained under the control with such difficulties may feel uncomfortable. According to the present exemplary embodiment, in view of such difficulties, the auxiliary control operation using the machine learning model (neural network in this case) is performed in a case where the present exemplary embodiment is disadvantageous in terms of accuracy or stability of the control operation, for example, when the motion is started or stopped.

The fourth exemplary embodiment differs from the first exemplary embodiment in that the focus control unit 1516, the estimation unit 1515, a PC communication unit 1522, and a learning unit 1503 are provided. Differences between the configuration example illustrated in FIG. 11 and the configuration example according to the first exemplary embodiment will be described below.

<Focus Control According to Present Exemplary Embodiment>

Figure 13:
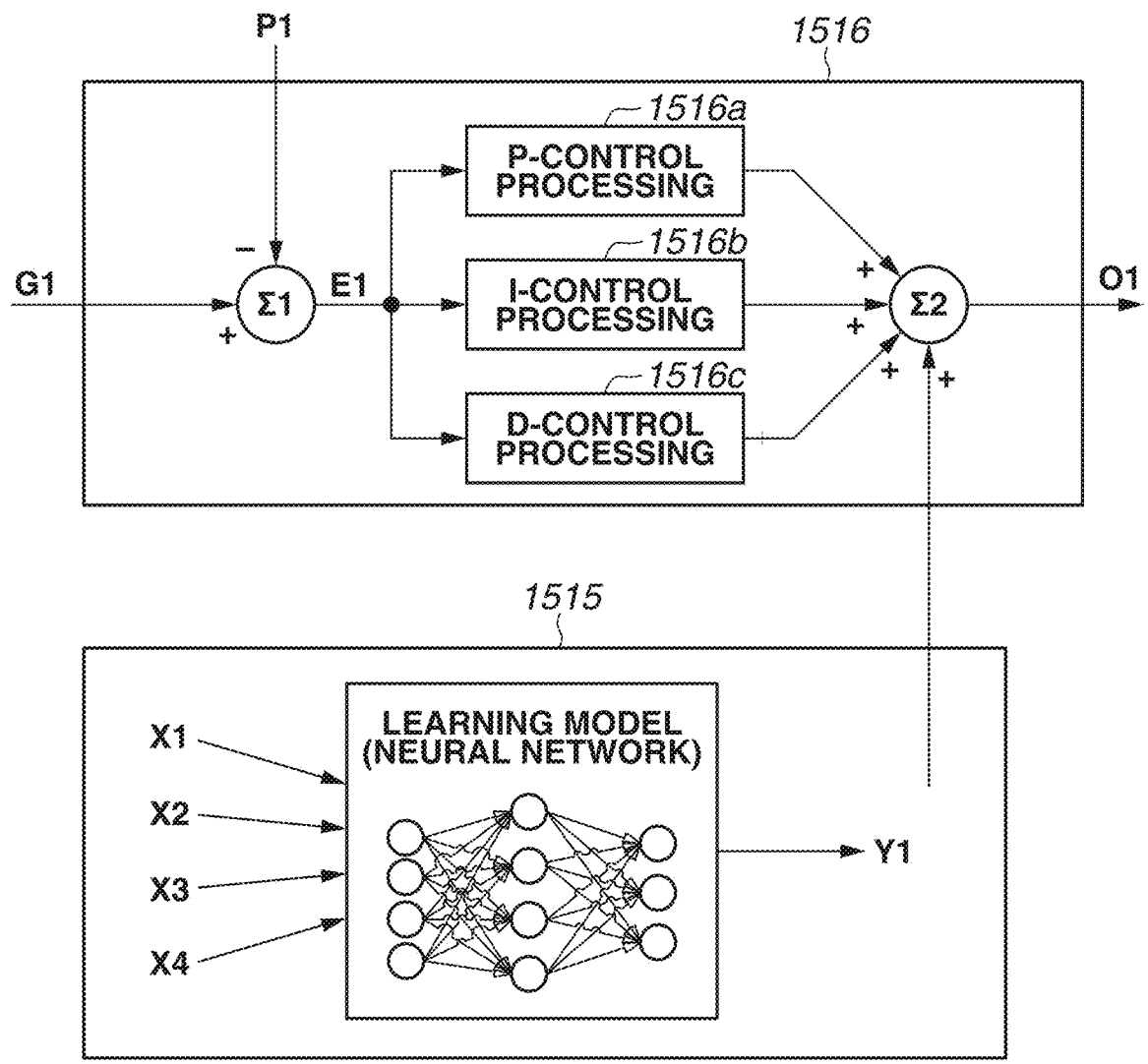
FIG. 13 illustrates a configuration example of a control system according to the fourth exemplary embodiment.

Focus control according to the fourth exemplary embodiment differs from focus control according to the first exemplary embodiment in that the lens microcomputer 113 includes the control unit 1516 and the estimation unit 1515. The control unit 1516 according to the present exemplary embodiment will be described with reference to FIG. 13. FIG. 13 illustrates a configuration example of a control system according to the fourth exemplary embodiment. In FIG. 13, G1 represents a target position for the focus lens drive unit 111 output from the communication unit 117. P1 represents an actual position (current position) of the focus lens unit 105 obtained from the focus lens detection unit 112. E1 represents a difference (deviation) between G1 and P1. The control unit 1516 includes a P-controller 1516a that performs P-control processing, an I-controller 1516b that performs I-control processing, and a D-controller 1516c that performs D-control processing. O1 represents a control signal for the focus lens drive unit 111. X1, X2, X3, and X4 are identical to those illustrated in FIG. 5. Y1 represents an output from the machine learning model for making the output (control signal) O1 from the control unit 1516 advantageous in terms of accuracy and stability of control processing. Σ1 represents an arithmetic unit (subtractor) for obtaining the deviation E1. Σ2 represents an arithmetic unit (adder) for obtaining the control signal O1 by adding the outputs from the controllers 1516a to 1516c.

The control unit 1516 generates the deviation E1 between the target position G1 and the actual position P1. The P-controller 1516a outputs a value obtained by multiplying a specific gain by the deviation E1. The I-controller 1516b outputs a value obtained by multiplying a specific gain by an integral value of the deviation E1. The D-controller 1516c outputs a value obtained by multiplying a specific gain by a derivative value of the deviation E1. The method in which the estimation unit 1515 outputs the output Y1 based on X1, X2, X3, and X4 is similar to that according to the first exemplary embodiment. In the control unit 1516, the arithmetic unit Σ2 adds the output from the P-controller 1516a, the output from the I-controller 1516b, the output from the D-controller 1516c, and the output Y1 from the estimation unit 1515 to obtain a control signal O1, and outputs the obtained control signal. In this manner, the focus lens unit 105 is controlled.

Here, the arithmetic unit Σ2 may determine whether to add the output Y1 from the estimation unit 1515 based on a specific condition. For example, when a motion image is being captured, the output Y1 may be added, or the output Y1 may not be added in the other cases, based on information indicating whether the motion image from the processor 205 of the camera body 200 is being captured. In the case of capturing a motion image that can be captured when the motion of the focus lens unit 105 is started or stopped, the output Y1 from the estimation unit 1515 may be added to achieve a smooth motion of the focus lens unit 105 when the motion is started or stopped. With this configuration, the processing load of the processor 113 can be reduced. Further, if the focus lens unit 105, in which an unevenness in the speed is easily noticeable, is moved at a speed lower than a threshold, the output Y1 from the estimation unit 1515 may be added. Further, if the depth of focus is less than or equal to a threshold and thus it may be desirable to obtain a higher positional accuracy, the output Y1 from the estimation unit 1515 may be added. Furthermore, during recording of a motion image, the output Y1 from the estimation unit 1515 may be added.

<Method for Generating Trained Machine Learning Parameter (Machine Learning Model)>

The generation method according to the present exemplary embodiment is different from the generation method according to the first exemplary embodiment in regard to the configurations of the estimation unit 1515 and the communication unit 1522 in the processor 113 and the learning unit 1503 in the PC 400. The target of machine learning and the target of the operation in the estimation unit 1515 is limited to a specific case of moving the focus lens unit 105 as described above. For example, a program for learning can locally repeat the motion of starting or stopping the focus lens unit 105. Further, this program enables execution of learning under different states or environments, for example, regarding the orientation and temperature of the lens apparatus 100.

The present exemplary embodiment differs from the above-described exemplary embodiments also in regard to information about a log to be transmitted from the communication unit 1522 to the communication unit 404. The log includes not only the input to and the output from the estimation unit 115, but also the input to and the output from the control unit 1516. The learning method except for the above-described points is similar to that according to the first exemplary embodiment.

Advantageous Effects of Present Exemplary Embodiment

According to the present exemplary embodiment, for the lens control, control using the machine learning model and other controls can be combined. Thus, a time for learning can be reduced by limiting the learning range of the machine learning model, or a processing time for the estimation unit 115 can be reduced by reducing the size of the machine learning model. Further, for example, in a scene in which highly accurate control is required, control using the machine learning model is applied, and in the other cases, other controls are used, thus reducing the processing load and power consumption in the processor 113.

<Other Control Targets>

In the present exemplary embodiment, focus control has been described, but the auxiliary control operation is not limited to the focus control. In this regard, the present exemplary embodiment is similar to the second exemplary embodiment. For example, in zoom control, if zooming is performed (zoom lens unit 102 is moved) at a speed lower than a threshold under which an unevenness in the speed is easily noticeable, an auxiliary control operation (addition of the output from the estimation unit 115) may be performed.

While the present exemplary embodiment illustrates an example where PID-control is combined with the machine learning model, different machine learning models may be combined. A plurality of different machine learning models, such as two learning models corresponding to a case where a motion is started and a case where a motion is stopped may be combined with other controls, such as PID-control.

<Exemplary Embodiments for Program, Storage Medium, and Data Structure>

The aspect of the embodiments can also be implemented through processing in which a program or data structure for implementing one or more functions according to the above-described exemplary embodiments is supplied to a system or apparatus via a network or storage medium, and a computer in the system or apparatus reads out and executes the program. The computer includes one or more processors or circuits. To read out and execute a computer-executable instruction, the computer may include a plurality of separated computers, a plurality of separated processors or circuits, or a network for circuits.

The processors or circuits may include a CPU, a micro processing unit (MPU), a GPU, an application specific integrated circuit (ASIC), and a field programmable gate array (FPGA). Further, the processors or circuits may include a digital signal processor (DSP), a data flow processor (DFP), and a neural processing unit (NPU).

Exemplary embodiments of the disclosure have been described above. However, the disclosure is not limited to the above-described exemplary embodiments, and various modifications and changes can be made within the scope of the aspect of the embodiments.

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2019-236836, filed Dec. 26, 2019 which is hereby incorporated by reference herein in its entirety.

What is claimed is:

1. A lens apparatus comprising:
   an optical member;
   a driving device configured to drive the optical member;
   a detector configured to detect a state relating to the driving; and
   a processor configured to generate a control signal for the driving device based on first information about the detected state,
   wherein the processor includes a machine learning model configured to generate an output relating to the control signal based on the first information and second information about the lens apparatus, the second information being different from the first information, the machine learning model being adjusted based on a granted reward with respect to the second information.

2. The lens apparatus according to claim 1, wherein the first information includes information about a position of the optical member.

3. The lens apparatus according to claim 1, wherein the second information includes information about at least one of a temperature, a tilt, and an optical characteristic of the lens apparatus.

4. The lens apparatus according to claim 1, wherein the machine learning model includes a neural network.

5. The lens apparatus according to claim 1,
   wherein the optical member is a focus lens unit, and
   wherein the second information includes at least one of information about a relationship between a shift amount of the focus lens unit and a shift amount of an image plane of the lens apparatus, information about a depth of focus of the lens apparatus, and information about an object distance of the lens apparatus.

6. The lens apparatus according to claim 1,
   wherein the optical member is a zoom lens unit, and
   wherein the second information includes at least one of information about a relationship between a position of the zoom lens unit and an angle of view of the lens apparatus, information about a relationship between a shift amount of the zoom lens unit and a shift amount of an image plane of the lens apparatus, and information about a depth of focus of the lens apparatus.

7. The lens apparatus according to claim 1,
wherein the optical member is an image shake correction lens unit, and
wherein the second information includes information indicating a relationship between a shift amount of the image shake correction lens unit and a shift amount of an image formed by the lens apparatus.

8. The lens apparatus according to claim 1,
wherein the optical member is an aperture stop, and
wherein the second information includes at least one of information about an F-number of the lens apparatus, information about a luminance of an image obtained via the lens apparatus, and information indicating a relationship among a position of a zoom lens unit included in the lens apparatus, an opening degree of the aperture stop, and an F-number of the lens apparatus.

9. The lens apparatus according to claim 1, wherein the second information includes information about a second optical member different from a first optical member serving as the optical member.

10. The lens apparatus according to claim 1,
wherein the optical member includes a first optical member and a second optical member different from the first optical member,
wherein the driving device includes a first driving device configured to drive the first optical member, and a second driving device configured to drive the second optical member, the second driving device being different from the first driving device, and
wherein the machine learning model generates, as the output, a first output for the first driving device and a second output for the second driving device.

11. The lens apparatus according to claim 1, wherein the machine learning model is configured to generates, as the output, a control signal for the driving device.

12. The lens apparatus according to claim 1,
wherein the processor includes a control unit configured to generate an output relating to the control signal, the control unit being different from the machine learning model, and
wherein the control signal is obtained based on an output generated by the controller and an output generated by the machine learning model.

13. The lens apparatus according to claim 12, wherein the machine learning model is configured to generate an output in a case where a predetermined condition is satisfied.

14. The lens apparatus according to claim 13, wherein the predetermined condition includes a condition for image pickup which is performed via the lens apparatus.

15. The lens apparatus according to claim 14, wherein the condition for the image pickup includes at least one of a condition that the image pickup is image pickup of a motion image, a condition that recording of a motion image is performed through the image pickup, a condition that zooming is performed at a speed not higher than a threshold, and a condition that image pickup of a motion image is performed at a depth of focus not wider than a threshold.

16. An image pickup apparatus comprising:
the lens apparatus according to claim 1; and
an image pickup element configured to pick up an image formed by the lens apparatus.

17. A control method of controlling generation of a control signal for a driving device configured to drive an optical member of a lens apparatus based on first information about a state of the driving, wherein, in the control method, a machine learning model is used, the machine learning model being configured to generate an output relating to the control signal based on the first information and second information about the lens apparatus different from the first information, a reward being granted to the machine learning model with respect to the second information, and the machine learning model being adjusted based on the reward.

18. A computer-readable storage medium storing a program for causing a computer to execute a control method according to claim 17.

19. The lens apparatus according to claim 1, wherein the processor is configured to grant the reward to the machine learning model with respect to the second information based on a performance of the lens apparatus.

20. The control method according to claim 17, wherein the reward is granted to the machine learning model with respect to the second information based on a performance of the lens apparatus.

21. A computer-readable storage medium storing a program for causing a computer to execute a control method according to claim 17.

* * * * *